(12) United States Patent
Yoshida et al.

(10) Patent No.: US 11,768,172 B2
(45) Date of Patent: Sep. 26, 2023

(54) INLINE PH SENSOR

(71) Applicant: Panasonic Intellectual Property Management Co., Ltd., Osaka (JP)

(72) Inventors: Hiroaki Yoshida, Osaka (JP); Toshifumi Nagino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/662,237

(22) Filed: May 6, 2022

(65) Prior Publication Data

US 2022/0381732 A1 Dec. 1, 2022

(30) Foreign Application Priority Data

May 31, 2021 (JP) .................................. 2021-091435

(51) Int. Cl.
G01N 27/416 (2006.01)
G01N 27/36 (2006.01)

(52) U.S. Cl.
CPC ......... G01N 27/4167 (2013.01); G01N 27/36 (2013.01)

(58) Field of Classification Search
CPC ... G01N 27/4167; G01N 27/36; G01N 27/302
See application file for complete search history.

(56) References Cited

U.S. PATENT DOCUMENTS

| 2003/0217919 | A1* | 11/2003 | Yajima | ............ | G01N 27/401 |
| | | | | | 204/435 |
| 2012/0145563 | A1 | 6/2012 | Tamada et al. | | |
| 2012/0152765 | A1* | 6/2012 | Trapp | ............ | G01N 27/4163 |
| | | | | | 204/415 |
| 2015/0024508 | A1 | 1/2015 | Horkheimer et al. | | |
| 2017/0307563 | A1 | 10/2017 | Okamura | | |

FOREIGN PATENT DOCUMENTS

| JP | 7-103932 | 4/1995 |
| JP | 2004-279298 | 10/2004 |

(Continued)

Primary Examiner — Jermele M Hollington
Assistant Examiner — Zannatul Ferdous
(74) Attorney, Agent, or Firm — Wenderoth, Lind & Ponack, L.L.P.

(57) ABSTRACT

A pH sensor includes a glass electrode unit to respond to pH; a comparative electrode unit to be measured for its potential relative to the glass electrode unit; a main pipe to convey test liquid; and a fluid inlet connected to the glass electrode unit and the main pipe. The glass electrode unit includes: a first storage unit filled with electrolyte solution; a first electrode to electrically connect the inside and outside of the first storage unit; a glass film disposed between the first storage unit and the main pipe; and a first pressure transmission unit connected to the fluid inlet. The first pressure transmission unit regulates the internal pressure of the first storage unit to control the pressure difference between the first storage unit and the main pipe separated by the glass film. The comparative electrode unit includes: a second storage unit filled with buffer solution; a second electrode to electrically connect the inside and outside of the second storage unit; a liquid junction unit disposed between the second storage unit and the main pipe; and a second pressure transmission unit connected to the fluid inlet. The second pressure transmission unit regulates the internal pressure of the second storage unit to control the pressure difference between the second storage unit and the main pipe separated by the liquid junction unit.

5 Claims, 3 Drawing Sheets

(56) References Cited

FOREIGN PATENT DOCUMENTS

| | | |
|---|---|---|
| JP | 2011-047685 | 3/2011 |
| JP | 2015-021964 | 2/2015 |
| JP | 2016-188818 | 11/2016 |

\* cited by examiner

INLINE PH SENSOR

BACKGROUND

1. Technical Field

The present disclosure relates to an inline PH sensor for pH measurement in pipes and channels.

2. Description of the Related Art

A liquid is measured for its pH as follows. Both a glass electrode whose potential changes in accordance with pH and a comparative electrode to be measured for its potential relative to the glass electrode are brought into contact with a test liquid. Then, the potential difference is measured. To maintain electric contact with the test liquid, it is ideal that only a little amount of the buffer solution contained in the comparative electrode is drawn into the test liquid through the liquid junction unit.

One method of measuring the pH of a fluid flowing in a pipe is to extract the fluid little by little from the pipe. However, this method is unfavorable when chemical reactions or productivity of the fluid is controlled by the flow in the pipe. In particular, in a synthesis method called micro flow synthesis, even a small amount of extraction of the fluid can have an adverse effect on the synthetic processes.

Patent Literature 1 discloses a traditional pH sensor that is used to perform continuous pH measurement of a fluid flowing in a pipe. Patent Literature 1 describes a method of stably drawing the buffer solution contained in the comparative electrode into a test liquid by making the fluid (text liquid) apply pressure to the buffer solution contained in the comparative electrode.

CITATION LIST

Patent Literature

Patent Literature 1: Japanese Unexamined Patent Application Publication No. 2004-279298

SUMMARY

The inline PH sensor according to one aspect of the present disclosure includes the following: a glass electrode unit to respond to pH; a comparative electrode unit to be measured for its potential relative to the glass electrode unit; a main pipe to convey test liquid; and a fluid inlet connected to the glass electrode unit and the main pipe. The glass electrode unit includes the following: a first storage unit filled with electrolyte solution; a first electrode to electrically connect the inside and outside of the first storage unit; a glass film disposed between the first storage unit and the main pipe; and a first pressure transmission unit connected to the fluid inlet. The first pressure transmission unit regulates the internal pressure of the first storage unit to control the pressure difference between the first storage unit and the main pipe separated by the glass film. The comparative electrode unit includes the following: a second storage unit filled with buffer solution; a second electrode to electrically connect the inside and outside of the second storage unit; a liquid junction unit disposed between the second storage unit and the main pipe; and a second pressure transmission unit connected to the fluid inlet. The second pressure transmission unit regulates the internal pressure of the second storage unit to control the pressure difference between the second storage unit and the main pipe separated by the liquid junction unit.

DETAILED DESCRIPTIONS

Figure 1:
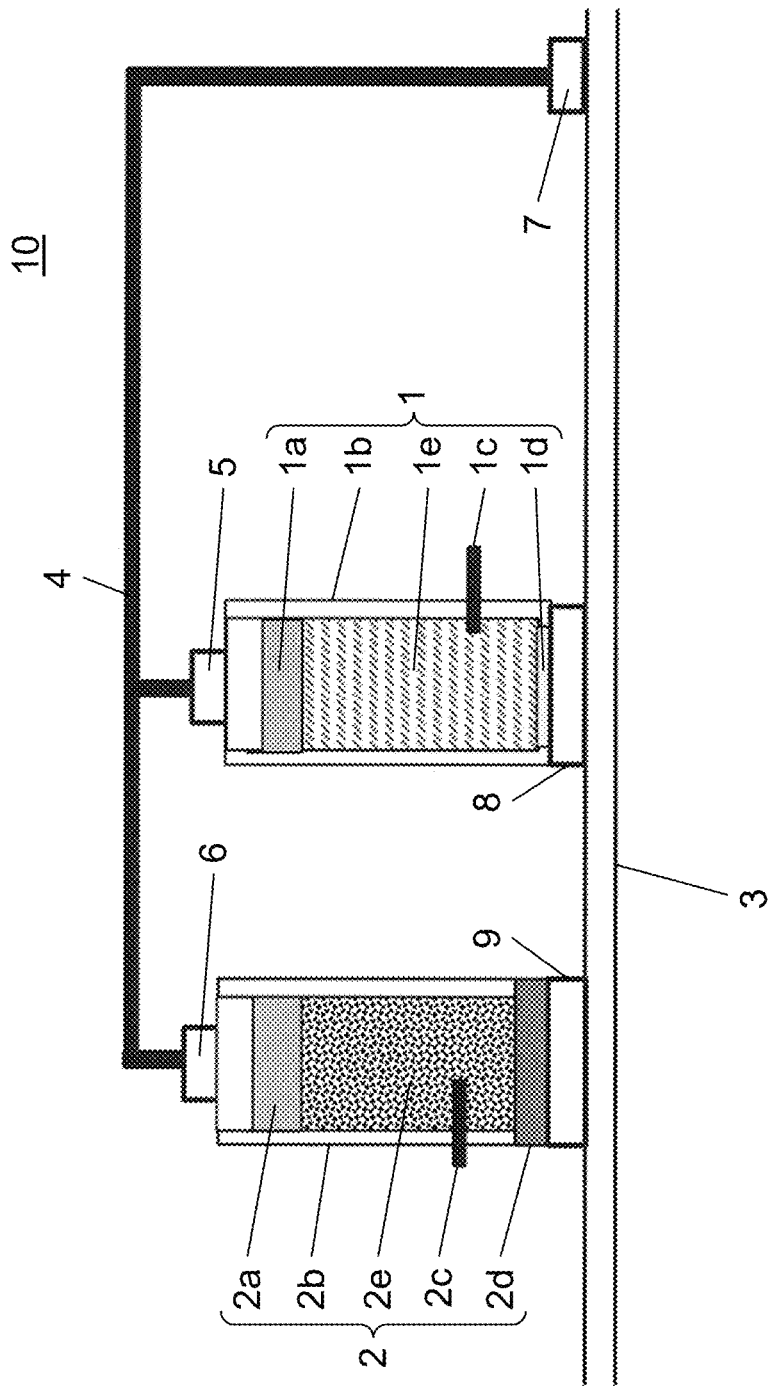
FIG. 1 is a schematic diagram of a cross sectional structure of an inline PH sensor according to a first embodiment.

Traditional inline PH sensors may cause a pressure increase in a channel due to the pressure loss caused by the channel width or the flow rate. Furthermore, when the pressure in the channel is purposely increased to employ, for example, a hydrothermal synthesis method, the glass film included in the glass electrode may be broken, making the pH measurement in the channel impossible.

To solve these traditional problems, an object of the present disclosure is to provide an inline PH sensor that can perform continuous pH measurement in a channel with high internal pressure.

The pH sensor according to a first aspect include a glass electrode unit to respond to pH; a comparative electrode unit to be measured for its potential relative to the glass electrode unit; a main pipe to convey test liquid; and a fluid inlet connected to the glass electrode unit and the main pipe. The glass electrode unit includes: a first storage unit filled with electrolyte solution; a first electrode to electrically connect the inside and outside of the first storage unit; a glass film disposed between the first storage unit and the main pipe; and a first pressure transmission unit connected to the fluid inlet. The first pressure transmission unit regulates the internal pressure of the first storage unit to control the pressure difference between the first storage unit and the main pipe separated by the glass film. The comparative electrode unit includes: a second storage unit filled with buffer solution; a second electrode to electrically connect the inside and outside of the second storage unit; a liquid junction unit disposed between the second storage unit and the main pipe; and a second pressure transmission unit connected to the fluid inlet. The second pressure transmission unit regulates the internal pressure of the second storage unit to control the pressure difference between the second storage unit and the main pipe separated by the liquid junction unit.

In a pH sensor according to a second aspect, one or both of the second storage unit and the fluid inlet may be disposed vertically above the liquid junction unit in the first aspect.

A pH sensor according to a third aspect may further include, in the first or second aspect, any of following detachable connection units: a first connection unit connecting the first pressure transmission unit and the fluid inlet; a second connection unit connecting the second pressure transmission unit and the fluid inlet; a third connection unit connecting the fluid inlet and the main pipe; a fourth connection unit connecting the main pipe and the glass film; and a fifth connection unit connecting the main pipe and the liquid junction unit.

In a pH sensor according to a fourth aspect, the glass film may have a thickness between 0.3 mm and 2.0 mm, inclusive in any of the first to third aspects.

In a pH sensor according to a fifth aspect, the liquid junction unit may contain a porous material with a bore between 0.1 µm and 50 µm, inclusive in any of the first to fourth aspects.

As described above, the inline PH sensor according to one aspect of the present disclosure can change the pressure inside the first storage unit in accordance with the pressure inside the main pipe. This reduces the pressure difference between the first storage unit and the main pipe, which are separated by the glass film disposed between them. This structure prevents damage of the glass film, enabling continuous pH measurement of the test liquid when pressure is applied to the inside of the main pipe.

The inline PH sensor according to the present embodiment will now be described with reference to the attached drawings.

First Embodiment

FIG. 1 is a schematic diagram of a cross sectional structure of inline PH sensor 10 of a first embodiment. Sensor 10 includes glass electrode unit 1, which responds to pH, comparative electrode unit 2, which is measured for its potential relative to glass electrode unit 1, main pipe 3 which conveys a test liquid, and fluid inlet 4 connected to glass electrode unit 1 and to main pipe 3. Glass electrode unit 1 and comparative electrode unit 2 are connected to main pipe 3. Fluid inlet 4 is connected to glass electrode unit 1 and main pipe 3.

Glass electrode unit 1 includes glass film 1$d$, first electrode 1$c$, first storage unit 1$b$, and first pressure transmission unit 1$a$. Part of first storage unit 1$b$ is connected to main pipe 3 with glass film 1$d$ disposed between them. Part of first storage unit 1$b$ is connected to fluid inlet 4 with first pressure transmission unit 1$a$ disposed between them. Consequently, first electrode 1$c$ provides electrical conduction between the inside and outside of first storage unit 1$b$. First storage unit 1$b$ is filled with electrolyte solution 1$e$.

Comparative electrode unit 2 has a constant potential that is independent of the pH of a test liquid. To stably measure the pH of the test liquid contained in main pipe 3 under pressure, comparative electrode unit 2 includes liquid junction unit 2$d$, second storage unit 2$b$, second electrode 2$c$, and second pressure transmission unit 2$a$. Part of second storage unit 2$b$ is connected to main pipe 3 with liquid junction unit 2$d$ disposed between them. Part of second storage unit 2$b$ is connected to fluid inlet 4 with second pressure transmission unit 2$a$ disposed between them. Consequently, second electrode 2$c$ provides electrical conduction between the inside and outside of second storage unit 2$b$. Second storage unit 2$b$ is filled with buffer solution 2$e$.

Inline PH sensor 10 can change the pressure inside first storage unit 1$b$ in accordance with the pressure inside main pipe 3. This reduces the pressure difference between first storage unit 1$b$ and main pipe 3, which are separated by glass film 1$d$ disposed between them. This structure prevents damage of glass film 1$d$, enabling continuous pH measurement of the test liquid when pressure is applied to the inside of main pipe 3.

Each component of inline PH sensor 10 will now be described as follows.

Glass Film

Glass film 1$d$ changes its potential in response to the hydrogen ion concentration of the test liquid. Film 1$d$ is made of glass that contains metal ions such as lithium ions or sodium ions. The thickness of film 1$d$ is preferably 0.3 mm or more for simple installation and is preferably 2 mm or less for high-sensitive measurement of its potential.

First Storage Unit

First storage unit 1$b$ has higher electrical resistance than glass film 1$d$ and also has pressure resistance similar to that of main pipe 3. For example, unit 1$b$ can be made of pressure-resistant glass or PEEK resin. To measure its potential, glass film 1$d$ can be filled with electrolyte solution 1$e$, such as an aqueous potassium chloride solution or a sodium chloride solution.

First Electrode

First electrode 1$c$ can measure the potential of glass film 1$d$. To ensure, for example, potential stability, first electrode 1$c$ can be either silver/silver chloride electrode or a calomel electrode depending on the type of the electrolyte contained in first storage unit 1$b$.

First Pressure Transmission Unit

First pressure transmission unit 1$a$ can transmit the pressure of main pipe 3 to the inside of first storage unit 1$b$ through fluid inlet 4. Furthermore, unit 1$a$ may be a pressure sensor or a similar device for detecting the pressure and feeding back and applying the pressure to first storage unit 1$b$. To prevent glass film 1$d$ from being damaged by pressure response or excessive pressure application, unit 1$a$ is preferably a diaphragm film, a piston, or a syringe gasket so as to transmit pressure directly to first storage unit 1$b$.

Liquid Junction Unit

Liquid junction unit 2$d$ enables buffer solution 2$e$ contained in second storage unit 2$b$ to be drawn into main pipe 3 so as to provide electric connection between the test liquid and second electrode 2$c$. Unit 2$d$ can be, for example, a porous material such as ceramics and stainless. If its bore is too large, the porous material causes excessive flow of buffer solution 2$e$ from second storage unit 2$b$ to main pipe 3 and contaminates the test liquid. This makes the accurate pH measurement of the test liquid impossible. On the other hand, if its bore is too small, the porous material causes insufficient flow of buffer solution 2$e$ from second storage unit 2$b$ to main pipe 3. This hinders the electric connection between second electrode 2$c$ and the test liquid, causing a difference between the actual pH of the test liquid and the measured pH. For these reasons, the bore of porous material is preferably between 0.1 µm and 50 µm, inclusive.

Second Electrode

Second electrode 2$c$ exhibits electric conductivity. To ensure potential stability, second electrode 2$c$ can be either silver/silver chloride electrode or a calomel electrode depending on the type of buffer solution 2$e$ contained in second storage unit 2$b$.

Second Storage Unit

Second storage unit 2$b$ has pressure resistance similar to that of main pipe 3. For example, unit 2$b$ can be made of pressure-resistant glass or PEEK resin. Unit 2$b$ is filled with buffer solution 2$e$, which can be an aqueous potassium chloride solution or a sodium chloride solution depending on the type of second electrode 2$c$ or the test liquid. Second storage unit 2$b$ is preferably disposed vertically above liquid junction unit 2$d$. This structure can prevent the backflow of the test liquid from main pipe 3 to second storage unit 2$b$ through liquid junction unit 2$d$, enabling buffer solution 2$e$ to be stably drawn to main pipe 3.

Second Pressure Transmission Unit

Second pressure transmission unit 2$a$ can transmit the pressure of main pipe 3 to the inside of second storage unit 2$b$ through fluid inlet 4. Furthermore, unit 2$a$ may be a pressure sensor or a similar device for detecting the pressure and feeding back and applying the pressure to second storage unit 2b. To prevent liquid junction unit 2d from being damaged by pressure response or excessive pressure application, unit 2d is preferably a diaphragm film, a piston, or a syringe gasket so as to transmit pressure directly to second storage unit 2b.

Main Pipe

Main pipe 3 can convey a test liquid. Pipe 3 can be a cylindrical pipe or a channel made by combining two plates one of which is processed to have a rectangular groove.

Fluid Inlet

Fluid inlet 4 can transmit the pressure of the test liquid contained in main pipe 3 to first pressure transmission unit 1a. Inlet 4 can be a cylindrical pipe or a channel made by combining two plates one of which is processed to have a rectangular groove. If fluid inlet 4 has too small a channel cross-sectional area, the channel can be clogged with particles or foreign matters contained in the test liquid, air bubbles, or the like. This causes the pressure of the test liquid contained in main pipe 3 unable to be transmitted to first pressure transmission unit 1a. On the other hand, if fluid inlet 4 has too large a channel cross-sectional area, unit 4 has a large internal volume, increasing the amount of the test liquid required for pH measurement. In addition, when the type of the test liquid in the main pipe is changed, the residual solution in fluid inlet 4 is more likely to contaminate the test liquid. For these reasons, the channel cross-sectional area of fluid inlet 4 is preferably between 0.01 mm$^2$ and 100 mm$^2$, inclusive. Furthermore, fluid inlet 4 is preferably disposed vertically above liquid junction unit 2d. This structure can prevent the backflow of the test liquid from main pipe 3 to second storage unit 2b through liquid junction unit 2d, enabling buffer solution 2e in second storage unit 2b to be stably drawn to main pipe 3.

First to Fifth Connection Units

Inline PH sensor 10 further includes first to fifth connection units 5-9. First connection unit 5 connects first pressure transmission unit 1a and fluid inlet 4. Second connection unit 6 connects second pressure transmission unit 2a and fluid inlet 4. Third connection unit 7 connects fluid inlet 4 and main pipe 3. Fourth connection unit 8 connects main pipe 3 and glass film 1d. Fifth connection unit 9 connects main pipe 3 and liquid junction unit 2d. Each of connection units 5 to 9 is preferably detachable for the following reason. At the start of pH measurement, this structure enables the test liquid to be easily introduced into fluid inlet 4, first pressure transmission unit 1a, and second pressure transmission unit 2a, thereby providing stable pH measurement.

The Principle of Inline pH Measurement

The principle of inline pH measurement of the test liquid contained in the main pipe under pressure in the present embodiment will now be described.

In glass electrode unit 1, the test liquid contained in main pipe 3 is introduced into first pressure transmission unit 1a through fluid inlet 4. The introduced test liquid causes the pressure of first pressure transmission unit 1a to change in accordance with the pressure of main pipe 3. First pressure transmission unit 1a transmits the pressure to the inside of first storage unit 1b, thereby reducing the pressure difference between the inside of first storage unit 1b and the inside of main pipe 3. This reduces the difference in pressure applied to glass film 1d from first storage unit 1b and from main pipe 3. As a result, glass film 1d is less likely to be damaged by the pressure difference between the inside of first storage unit 1b and the inside of main pipe 3, enabling the inline pH measurement of the test liquid under pressure.

In comparative electrode unit 2, the test liquid contained in main pipe 3 is introduced into second pressure transmission unit 2a through fluid inlet 4. The introduced test liquid causes the pressure of second pressure transmission unit 2a to change in accordance with the pressure of main pipe 3. Second pressure transmission unit 2a transmits the pressure to the inside of second storage unit 2b. As a result, buffer solution 2e in second storage unit 2b can be stably drawn to main pipe 3 through liquid junction unit 2d. Furthermore, the test liquid can be prevented from flowing from main pipe 3 to second storage unit 2b through liquid junction unit 2d, thereby achieving inline pH measurement of the test liquid.

One or both of second storage unit 2b and fluid inlet 4 is disposed vertically above liquid junction unit 2d. This structure increases the pressure applied to the second storage unit 2b side of liquid junction unit 2d by the weights of the test liquid inside fluid inlet 4 and the buffer solution 2e in second storage unit 2b. As a result, buffer solution 2e in second storage unit 2b can be stably drawn to main pipe 3 through liquid junction unit 2d, thereby providing stabler inline pH measurement of the test liquid.

Example

Example will now be described in detail as follows.

Example

An inline PH sensor was manufactured in the following method.

A Method of Manufacturing an Inline PH Sensor

First pressure transmission unit 1a was prepared from a syringe gasket which has an outer diameter of Φ 30 mm and a thickness of 10 mm and is coated with PTFE. First storage unit 1b was prepared from borosilicate glass processed into a cylinder with an inner diameter of Φ 30 mm and a thickness of 3 mm. Electrolyte solution 1e was prepared from an aqueous potassium chloride solution (3.33 mol/L). First electrode 1c was prepared from silver/silver chloride electrode. The inside and outside of first storage unit 1b were electrically connected to measure the voltage of glass film 1d.

Glass film 1d was prepared from glass that has the following composition: $Li_2O$ (28 at %), $Cs_2O$ (3 at %), $La_2O_3$ (4 at %), and $SiO_2$ (65 at %). Glass film 1d was processed to a thickness of 0.5 mm so as to reduce the electrical resistance between first storage unit 1b and main pipe 3. Second pressure transmission unit 2a was prepared from a syringe gasket which had an outer diameter of Φ 30 mm and a thickness of 10 mm and was coated with PTFE. Second storage unit 2b was prepared from borosilicate glass processed into a cylinder with an inner diameter of Φ 30 mm and a thickness of 3 mm. Buffer solution 2e was prepared from an aqueous potassium chloride solution (3.33 mol/L).

Second electrode 2c was prepared from silver/silver chloride electrode. The inside and outside of second storage unit 2b were electrically connected to measure the voltage of the comparative electrode.

Liquid junction unit 2d was prepared from an in-line ceramic filter with a bore of 3 μm and a thickness of 2 mm. The filter was connected between the main pipe and second storage unit 2b. Each of main pipe 3 and fluid inlet 4 was prepared from a PTFE tube with an inner diameter of Φ 1 mm and an outer diameter of Φ 1/16 inch. First-fifth connection units 5-9 were prepared from a stainless steel union. The joint of the union had an orifice diameter of 1 mm (10-32 UNF standard).

Measuring Method

Figure 2:
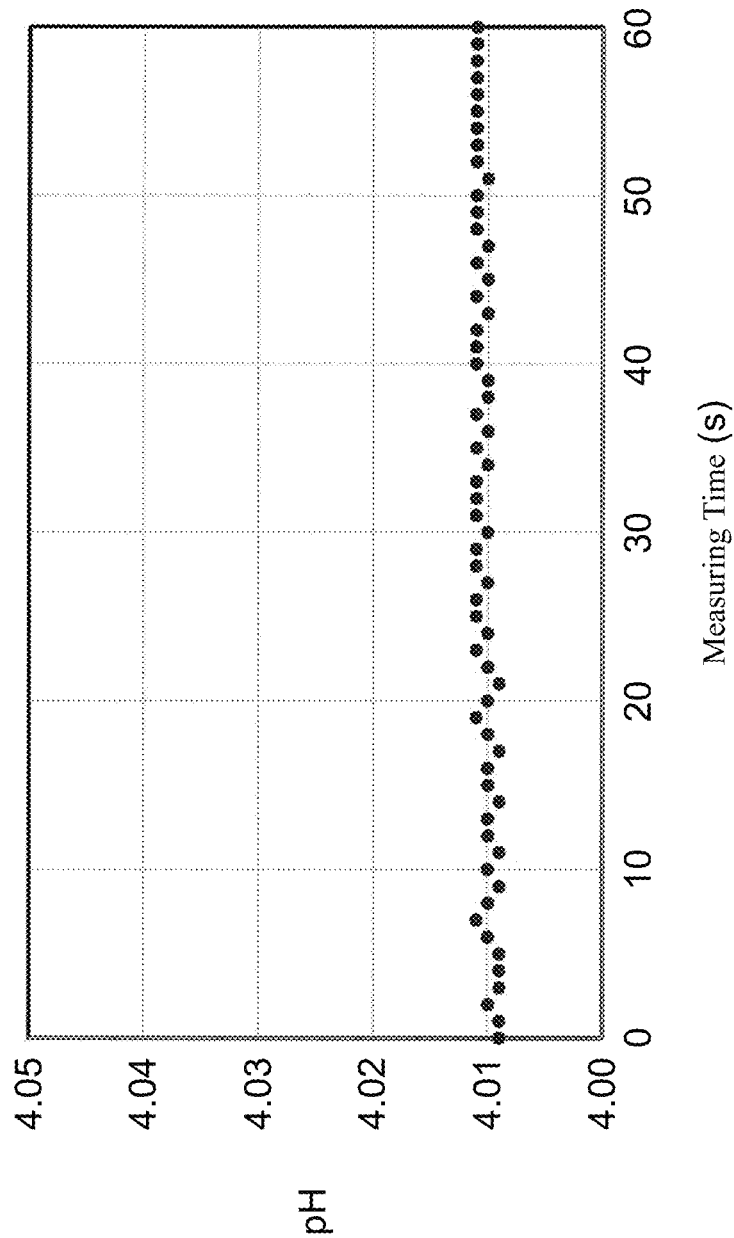
FIG. 2 is a graph showing pH measurement results in Example.

A phosphate standard solution (pH: 6.86) and a phthalate standard solution (pH: 4.01) were drawn in this order into the main pipe. After the potential difference between first electrode 1c and second electrode 2c was calibrated, pure water was drawn to clean main pipe 3. A plunger pump and a back pressure valve were connected to the upstream and the downstream, respectively, of main pipe 3. The phthalate standard solution was circulated through main pipe 3 to make the flow 5 ml/min and the pressure 1 MPa. The pH during 60 seconds of circulation was measured, and the results are shown in the graph of FIG. 2. FIG. 2 indicates that the measured pH of the test liquid was about 4.01.

The results shown in FIG. 2 have revealed that the inline PH sensor of Example can change the pressure inside first storage unit 1b in accordance with the pressure inside main pipe 3, thereby reducing the pressure difference between first storage unit 1b and main pipe 3 separated by glass film 1d disposed between them. This structure can prevent damage of glass film 1d, thereby enabling continuous pH measurement of the test liquid when the inside of main pipe 3 is under pressure.

Comparative Example 1-1

The pH of the phthalate standard solution was measured in the same manner as Example except that first connection unit 5 was closed with a plug. When a pressure of 1 MPa was applied to main pipe 3 by regulating the back pressure valve in the downstream, glass film 1d broke and pH measurement became impossible.

These results have revealed that the test liquid contained in the channel under pressure cannot be measured for its pH without control of the pressure difference between first storage unit 1b and main pipe 3, which are separated by glass film 1d disposed between them.

Comparative Example 1-2

Figure 3:
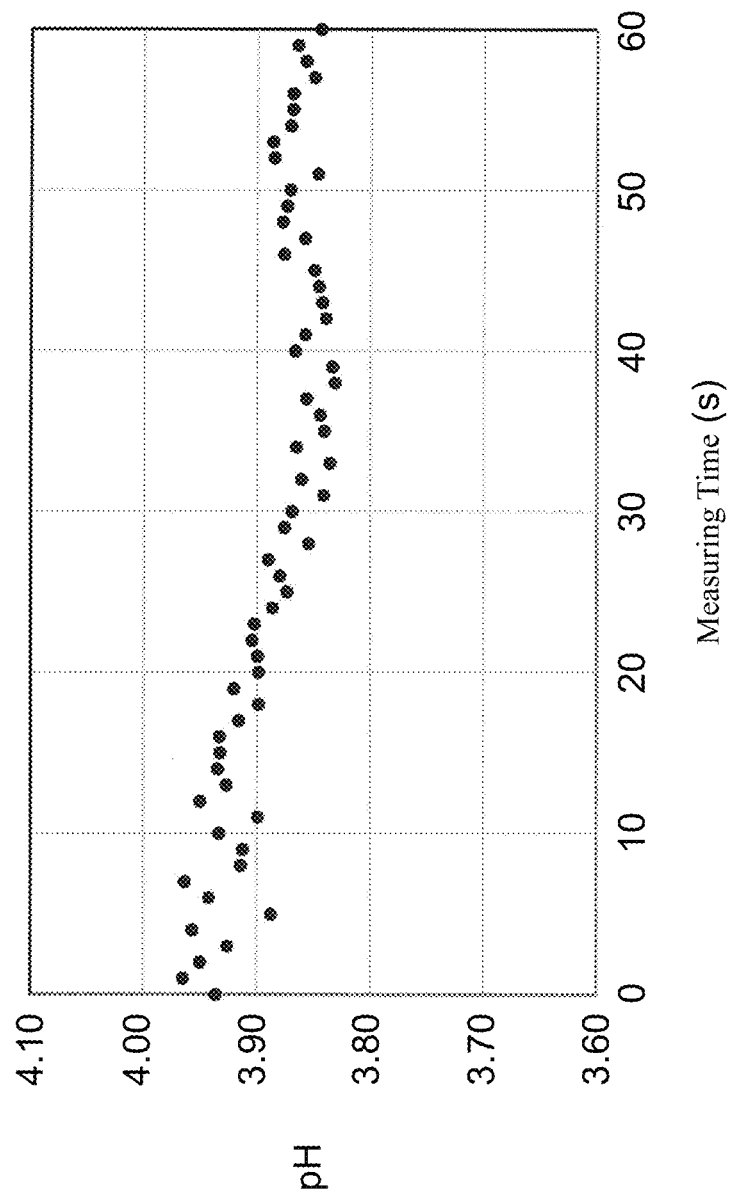
FIG. 3 is a graph showing pH measurement results in Comparative Example 1-2.

The pH of phthalate standard solution was measured in the same manner as Example except that second connection unit 6 was closed with a plug. The results are shown in FIG. 3. The results indicate that the pH of the test liquid varies in the range of about 3.80 to 4.00.

A comparison between the results of FIG. 2 and those of FIG. 3 has revealed the following facts. If the pressure difference between second storage unit 2b and main pipe 3, which are separated with liquid junction unit 2d disposed between them is not controlled, buffer solution 2e cannot be properly drawn to main pipe 3, thereby making it impossible to perform stable pH measurement of the test liquid in the channel under pressure.

Note that the present disclosure includes any combination of exemplary embodiments and/or Examples of the aforementioned various exemplary embodiments and/or Examples to provide the effects of each exemplary embodiment and/or Example.

INDUSTRIAL APPLICABILITY

The inline PH sensor according to the first aspect of the present disclosure can perform continuous pH measurement of a solution flowing in a channel under pressure. Furthermore, reducing the internal volume of each unit may perform continuous pH measurement of a micro fluid by, for example, a synthesis method called micro flow synthesis.

REFERENCE NUMERALS 1 glass electrode unit
1a first pressure transmission unit
1b first storage unit
1c first electrode
1d glass film
1e electrolyte solution
2 comparative electrode unit
2a second pressure transmission unit
2b second storage unit
2c second electrode
2d liquid junction unit
2e buffer solution
3 main pipe
4 fluid inlet
5 first connection unit
6 second connection unit
7 third connection unit
8 fourth connection unit
9 fifth connection unit
10 inline PH sensor

What is claimed is:

1. A pH sensor comprising:
a glass electrode unit configured to respond to pH;
a comparative electrode unit configured to be measured for a potential relative to the glass electrode unit;
a main pipe configured to convey test liquid; and
a fluid inlet connected to the glass electrode unit and the main pipe,
wherein the glass electrode unit includes:
a first storage unit filled with electrolyte solution;
a first electrode configured to electrically connect an inside and an outside of the first storage unit;
a glass film disposed between the first storage unit and the main pipe; and
a first pressure transmission unit connected to the fluid inlet, the first pressure transmission unit regulating an internal pressure of the first storage unit to control pressure difference between the first storage unit and the main pipe separated by the glass film,
the comparative electrode unit includes:
a second storage unit filled with buffer solution;
a second electrode configured to electrically connect an inside and an outside of the second storage unit;
a liquid junction unit disposed between the second storage unit and the main pipe; and
a second pressure transmission unit connected to the fluid inlet, the second pressure transmission unit regulating an internal pressure of the second storage unit to control pressure difference between the second storage unit and the main pipe separated by the liquid junction unit.

2. The pH sensor according to claim 1, wherein one or both of the second storage unit and the fluid inlet is disposed vertically above the liquid junction unit.

3. The pH sensor according to claim 1 further comprising any of following detachable connection units:
a first connection unit connecting the first pressure transmission unit and the fluid inlet;
a second connection unit connecting the second pressure transmission unit and the fluid inlet;
a third connection unit connecting the fluid inlet and the main pipe;
a fourth connection unit connecting the main pipe and the glass film; and a fifth connection unit connecting the main pipe and the liquid junction unit.

4. The pH sensor according to claim 1, wherein the glass film has a thickness between 0.3 mm and 2.0 mm, inclusive.

5. The pH sensor according to claim 1, wherein the liquid junction unit contains a porous material with a bore between 0.1 μm and 50 μm, inclusive.

* * * * *